(12) United States Patent
Houben

(10) Patent No.: US 7,040,185 B2
(45) Date of Patent: May 9, 2006

(54) DEVICE FOR DRIVING AN OUTPUT MECHANISM

(75) Inventor: Sjong Houben, Poppel (BE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 10/451,355

(22) PCT Filed: Dec. 19, 2001

(86) PCT No.: PCT/DE01/04792

§ 371 (c)(1),
(2), (4) Date: Dec. 22, 2003

(87) PCT Pub. No.: WO02/052173

PCT Pub. Date: Jul. 4, 2002

(65) Prior Publication Data

US 2004/0087404 A1    May 6, 2004

(30) Foreign Application Priority Data

Dec. 23, 2000 (DE) ................. 100 64 899

(51) Int. Cl.
*F16H 29/00* (2006.01)
*F16H 29/20* (2006.01)
*F16D 11/06* (2006.01)

(52) U.S. Cl. .............. 74/116; 74/169; 192/45

(58) Field of Classification Search .............. 74/112, 74/116, 118, 122, 125.5, 126, 141.5, 143; 192/41 R, 45
See application file for complete search history.

(56) References Cited

U.S. PATENT DOCUMENTS

| | | | | |
|---|---|---|---|---|
| 1,168,091 A | * | 1/1916 | Maughmer | 74/116 |
| 1,985,406 A | * | 12/1934 | Galkin | 192/12 B |
| 2,692,510 A | * | 10/1954 | Gille | 74/119 |
| 2,997,888 A | | 8/1961 | Rust | |
| 3,332,201 A | | 7/1967 | Popp et al. | |
| 3,332,301 A | | 7/1967 | Popp et al. | |
| 3,726,149 A | | 4/1973 | Ilines | |
| 3,848,474 A | | 11/1974 | Epstein | |
| 3,930,416 A | * | 1/1976 | Dahlstrom | 74/125.5 |
| 3,951,005 A | * | 4/1976 | Dahlstrom | 74/125.5 |
| 4,378,706 A | | 4/1983 | Miyamoto | |
| 4,565,105 A | | 1/1986 | Peterson | |
| 4,680,980 A | * | 7/1987 | Olson | 74/125 |
| 5,022,505 A | | 6/1991 | Io | |
| 5,187,994 A | | 2/1993 | Hirai et al. | |

FOREIGN PATENT DOCUMENTS

| | | |
|---|---|---|
| CN | 1203969 | 1/1999 |
| DE | 259 132 C | 4/1913 |
| DE | 677 130 | 6/1939 |
| DE | 844 522 | 7/1952 |
| DE | 757 391 | 10/1953 |
| DE | 10 49 188 B | 1/1959 |
| DE | 1 500 353 | 8/1969 |
| DE | 2 114 147 | 10/1972 |

(Continued)

Primary Examiner—Roger Pang
(74) Attorney, Agent, or Firm—Michael J. Striker

(57) ABSTRACT

A device for driving an output mechanism has a rotationally drivable input shaft, a structure located between the input shaft and the outlet mechanism for transmitting a drive torque to the input shaft to the output mechanism, wherein a non-positive functional connection can be created between a first element and the output mechanism, enabling an alternating movement of the first element to be converted into a movement of the output mechanism.

7 Claims, 8 Drawing Sheets

FOREIGN PATENT DOCUMENTS

| | | |
|---|---|---|
| DE | 296 06 762 U1 | 8/1996 |
| DE | 197 43 483 A1 | 4/1999 |
| EP | 0 073 923 A | 3/1983 |
| EP | 0 368 526 A1 | 5/1990 |
| EP | 0482827 | 4/1992 |
| GB | 191024157 | 3/1911 |
| GB | 1 480 159 | 7/1977 |
| GB | 2 054 794 A | 2/1981 |
| JP | 7054954 | 2/1995 |
| WO | 99/39116 | 8/1999 |
| WO | 00/52173 | 9/2000 |

* cited by examiner

DEVICE FOR DRIVING AN OUTPUT MECHANISM

BACKGROUND OF THE INVENTION

The invention relates to a device for driving an output mechanism with a rotating input shaft.

Devices for driving an output mechanism with a rotating input shaft are made known in the prior art, said devices being used in drills, impact drills or the like. Devices of this type comprise a plurality of gear wheels between the input shaft and the output mechanism, which said gear wheels are provided for ratio-conversion purposes and form a non-positive connection between the input shaft and the output mechanism in order to transform a high rotational speed of the input shaft serving as drive into a lower frequency of motion or rotational speed of the output mechanism while simultaneously increasing the drive force to be transmitted to the output mechanism.

The disadvantage of this, however, is the fact that the use of gear wheels translates into high production costs in the fabrication of the known devices, and, when used in drills, impact hammers or rotating impact hammers, their total costs are increased by said gear wheels.

SUMMARY OF THE INVENTION

With the devices according to the invention for driving an output mechanism with a rotationally driveable input shaft, in the case of which means are located between the input shaft and the output mechanism for transmitting a drive torque of the input shaft to the output mechanism, and a non-positive functional connection can be created between a first means and the output mechanism, enabling an alternating movement of the first means into be converted into a movement of the output mechanism, the driving of the output mechanism takes place in simple fashion without gear wheels, by way of which the production costs are advantageously reduced considerably, especially when larger conversion ratios are involved.

Moreover, the device according to the invention offers the advantage that a high rotational speed of the input shaft can be converted into a considerably slower movement or frequency of motion of the output mechanism, enabling a desired strong driving force of the output mechanism to be generated.

Further advantages result from the description of drawings hereinbelow. A plurality of exemplary embodiments of the invention are presented in the drawings. The drawings, the description, and the claims contain numerous features in combination. One skilled in the art will advantageously consider them individually as well and combine them into reasonable further combinations.

DESCRIPTION OF THE PREFERRED EMBODIMENTS

Figure 1:
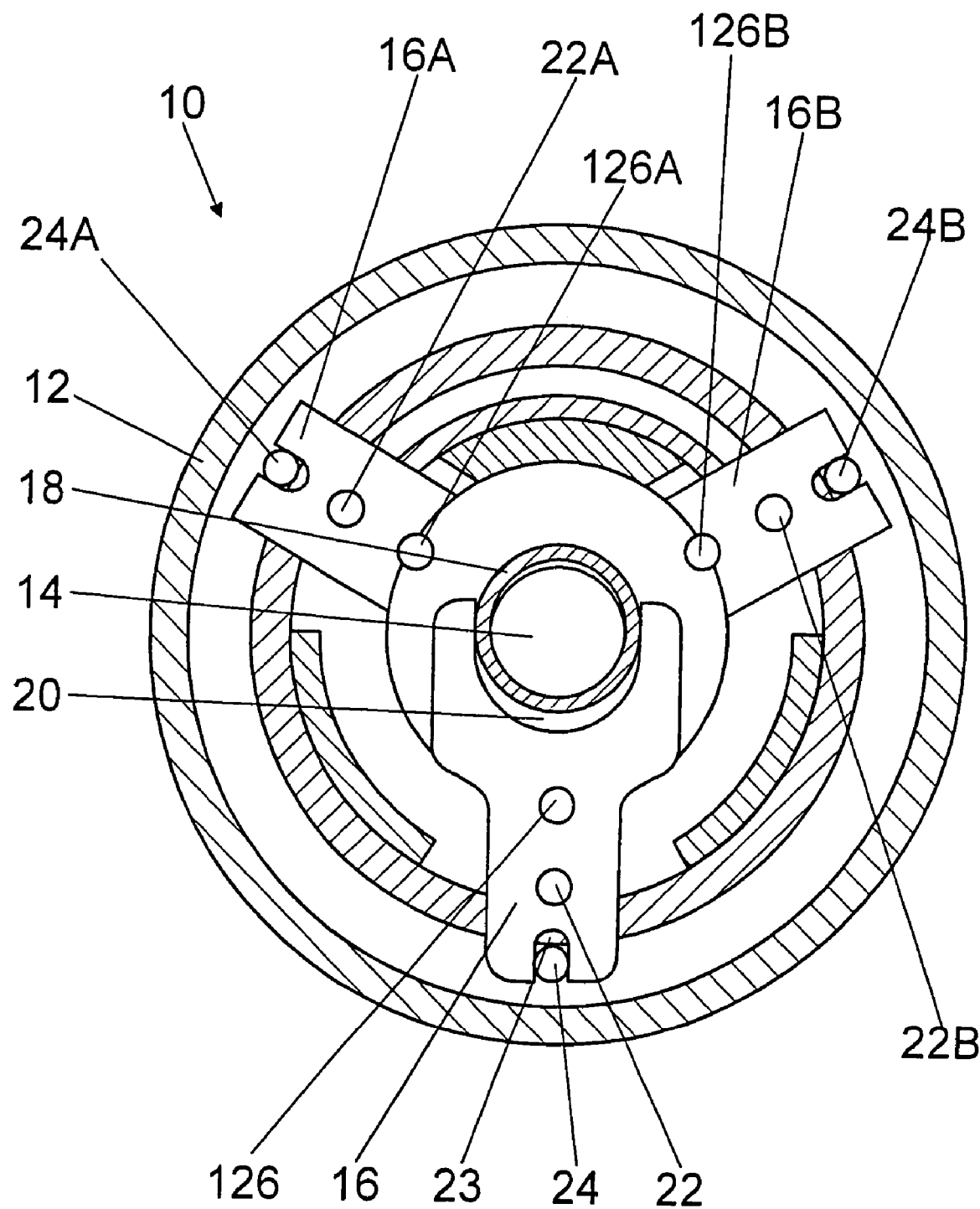
FIG. 1 is a cross-sectional view of the first exemplary embodiment of the device according to the invention.
Figure 2:
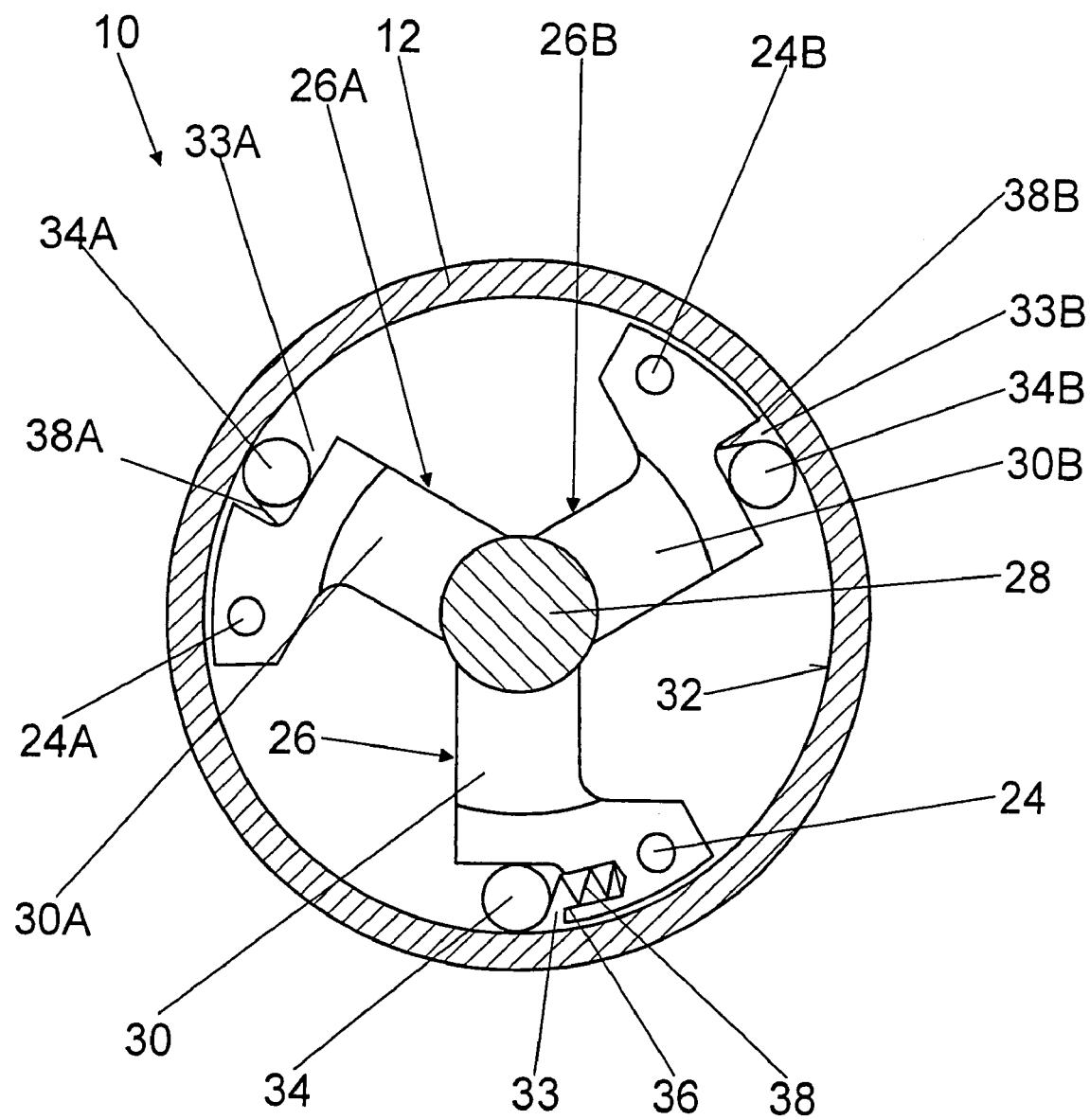
FIG. 2 is a further cross-sectional view of the device according to FIG. 1.

FIGS. 1 and 2 show a device 10 for driving an output mechanism via an annular body 12, comprising a rotationally driveable input shaft 14 of the device 10 that serves simultaneously as the output shaft of a not-shown electric motor. Means for transmitting a drive torque of the input shaft 14 to the output mechanism or the annular body 12 installed upstream from the output mechanism are located between the input shaft 14 and the output mechanism.

A non-positive functional connection can be created between a first means 16 configured as oscillating crank and the output mechanism, by means of which an alternating movement of the oscillating crank 16 can be converted into a plurality of successive movements or rotational movements of the output mechanism in one direction, whereby the multiple movements effect a continuous operation of the output mechanism. In addition to the first oscillating crank 16, two oscillating cranks 16A and 16B of identical design are situated at 120° angles relative to each other and are arranged coaxially in tandem.

The mode of action of the oscillating crank 16 described hereinbelow applies equally for the oscillating cranks 16A and 16B as well.

The output mechanism—not shown in FIG. 1 and FIG. 2—is interconnected with the annular body 12 via a suitable connection in a region located behind the plane of the drawing such that a rotational movement of the annular body 12 results in a rotational movement of the output mechanism.

The input shaft 14 is equipped with a sleeve 18 configured with an annular cross-section, which said sleeve is located in a recess 20 of the oscillating crank 16 and is provided as an eccentric element for driving the oscillating crank 16 in an alternating manner. The oscillating crank 16, in turn, is interconnected via a pivot pin 22 with a not-shown housing of the device 10. When the input shaft 14 and the sleeve 18—which is eccentrically situated relative to the input shaft 14 and its axis of rotation—rotates, the oscillating crank 16 is moved to and fro and/or is swiveled to and fro in alternating fashion around the pivot pin 22. One skilled in the art understands as a matter of course that the sleeve 18 must also be configured as a single component with the input shaft 14, e.g., as a cam of a camshaft.

On its end furthest from the recess 20, the oscillating crank 16 comprises a recess 23 in which a driver 24 is located, which said driver is interconnected with a second means 26. The second means 26 is turnably supported on an axis 28 and equipped with an arm 30 directed radially outwardly from the axis 28. Instead of arms, disks arranged in tandem in the axial direction are also feasible in principle. The oscillating crank 16 and the second means 26 are turnably interconnected via the driver 24 in such a way that the alternating movement of the oscillating crank 16 effected by the rotation of the input shaft 14 effects a rotational movement or a rotation of the arm 30 around the axis 28.

A transfer element formed by a rolling element 34 is located in the recess 33 between an inner surface 32 of the annular element or outer ring 12 that surrounds the second means 26 and is situated coaxial to the axis 28, and the end of the arm 30 configured with a recess 33. In the present exemplary embodiment, the rolling element 34 is configured as cylindrical body 34, although one skilled in the art will understand as a matter of course that the rolling element can be configured as balls, barrel-shaped bodies or the like. Furthermore, various types of sliding blocks, etc. would be feasible as well.

In the region of the recess 33, the arm 30 comprises a blind-hole bore 36 in which a spring 38 is located, one end of which rests against the bottom of the blind-hole bore 36 and the other end of which rests against the rolling element 34.

When the driver 24 moves in the counter-clockwise direction, as shown in the illustration in FIG. 2, the cylindrical body 34 walks around between the inner surface 32 of the annular body 12 and the end of the arm 30 and becomes lodged between the inner surface 32 of the annular element 12 and the end of the arm 30 closest to the annular element 12. The annular body 12 is set into rotation in the counter-clockwise direction. The second means 26, 26A, 26B drive the annular body 12 via the cylindrical bodies 34, 34A, 34B and, therefore, the not-shown output mechanism, in succession and in stepwise fashion. When the driver 24 moves in the clockwise direction, the cylindrical body 34—loaded by the spring 38—only rolls or walks around on the inner surface 32 of the annular body 12 without becoming lodged. It is also possible for the body 34 to glide on the inner surface 32 when the driver 24 moved in the clockwise direction.

The clearance between the driver 24 and the pivot pin 22 can be changed and, with the clearance, a conversion ratio that sets in, namely by placing the pivot pin 22 radially inwardly in an alternative recess 126. A stepless displacement of a pivot pin and, therefore, a stepless adjustment of a conversion ratio would be feasible in principle as well.

With the different positioning of the pivot pin 22, a scope of a reduction of the rotational speed coming from the input shaft 14 that is ultimately transmitted to the output mechanism can be adjusted in simple fashion, thereby enabling an adjustment of the level of the value of the output torque applied to the output mechanism.

In contrast to the manner described herein, according to which the annular body 12 can be set into rotation only in the counter-clockwise direction, a further exemplary embodiment that deviates from the present exemplary embodiment can provide that the arm of the second means is structurally configured such that the annular body 12 can be set into rotation in the clockwise direction and in the counter-clockwise direction. An embodiment of the device of this nature can be provided for use in a drill having two different directions of rotation, although it can also be used in other machines appearing practical to one skilled in the art.

Moreover, it is also possible, of course, to provide more than or fewer than the proposed number of arms to drive the output mechanism, in order to obtain a drive system adapted to the specific application at hand.

FIGS. 3 through 6 show a further exemplary embodiment of the device 10. Components having the identical construction or the same functionality are labelled with the same reference numerals as in the description of the exemplary embodiment of the device 10 according to FIG. 1 and FIG. 2.

Figure 3:
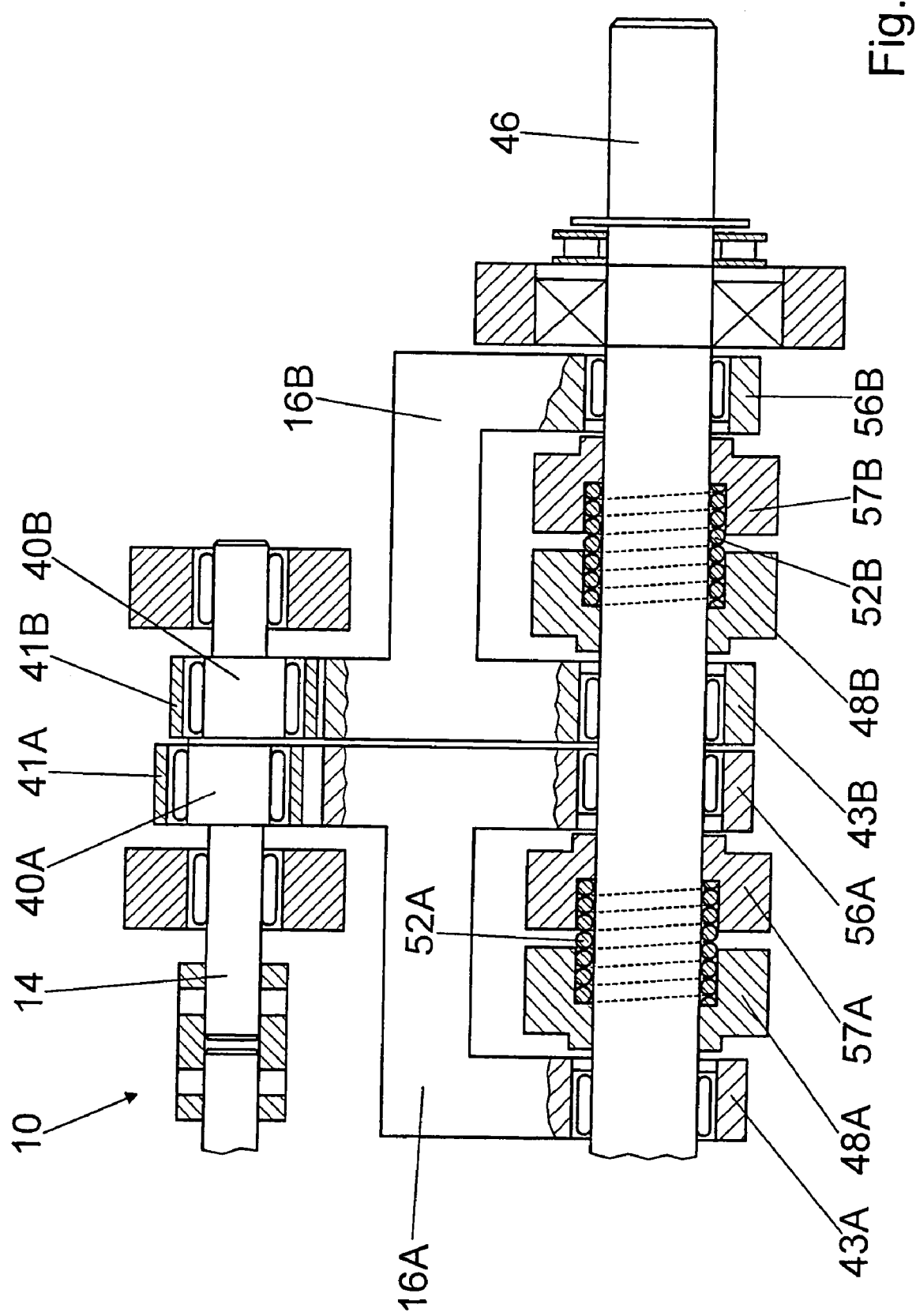
FIG. 3 is a longitudinal sectional view of the device according to the invention.
Figure 4:
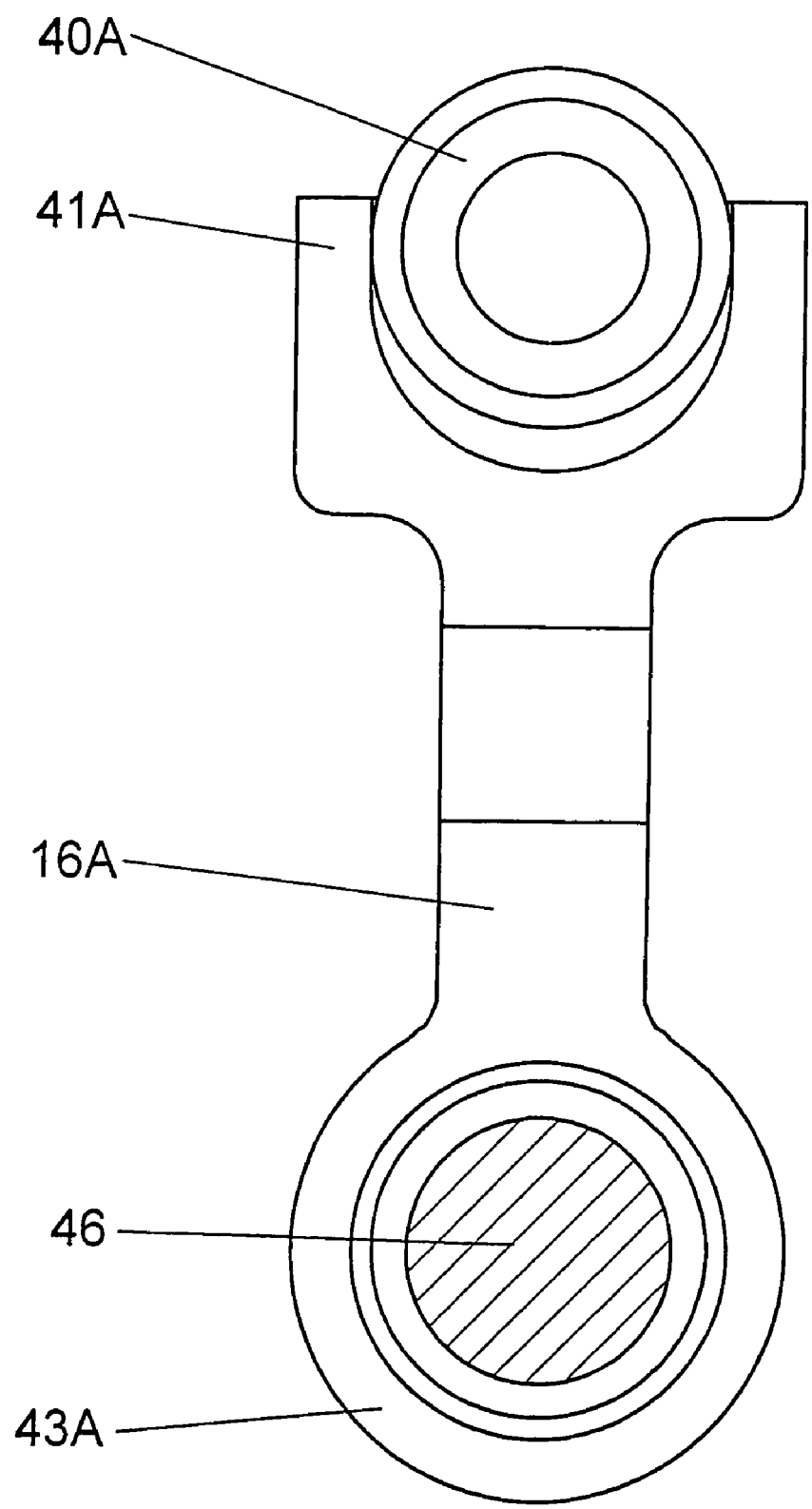
FIG. 4 shows an oscillating crank of the device by itself, wherein the oscillating crank is functionally connected with the input shaft and the output mechanism.

As shown in FIG. 3, the first means is composed of two oscillating cranks 16A and 16B having essentially the same construction. For this reason, only the oscillating crank 16A and the further construction of the device 10 in the region of the oscillating cranks 16A will be discussed in the description hereinbelow of the mode of action of the device 10. The only difference lies in the arrangement of the oscillating cranks 16A and 16B on the input shaft 14, since the input shaft 14 comprises two eccentric elements 40A, 40B offset by 180° relative to each other on which the two oscillating cranks 16A and 16B are guided with two forks 41A, 41B, and that are set into motion phase-displaced by 180° relative to each other when the input shaft 14 rotates. The two eccentric elements 40A, 40B are configured as circular cams integral with the input shaft 14. Their axes of rotation are arranged offset to the axis of rotation of the input shaft 14. One rotation of the input shaft 14 effects an alternating movement of the oscillating crank 16A. The oscillating crank 16A is interconnected with the output mechanism 46 via two further hubs 43A, 56A. Said oscillating crank is swiveled to and fro around said hubs depending on the position of the eccentric element 40A.

Figure 5:
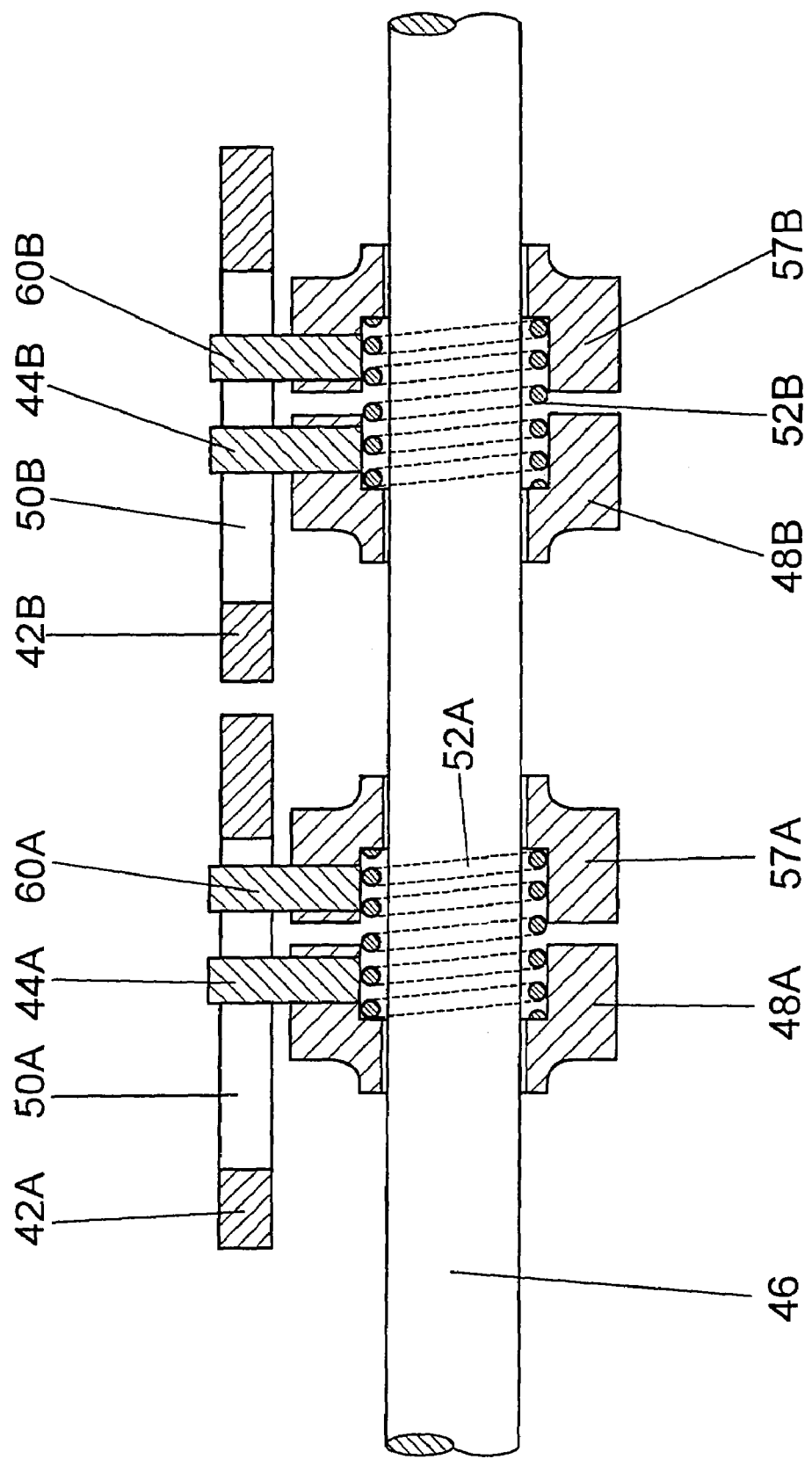
FIG. 5 is a partial view of the device according to the invention, according to FIG. 3 and FIG. 4.

The alternating swiveling movement of the oscillating crank 16A is transferred to a third means 42A. The third means 42A—which are situated such that they are axially displaceable relative to the oscillating crank 16A and/or the first means—are functionally interconnected with one annular body 48A, 57A, respectively, situated on the output mechanism 46 via one guide element 44A, 60A, respectively, each of which said guide elements 44A, 60A being situated with its end furthest from the annular bodies 48A, 57A, respectively, in a recess 50A of the third means 42A and, with its end closest to the annular bodies 48A, 57A, being interconnected in fixed fashion with one of the annular bodies 48A, 57A, respectively (FIG. 5).

A spring 52A encircling the output mechanism 46 is situated between the annular bodies 48A, 57A, said spring 52A being interconnected with the annular bodies 48A, 57A in fixed fashion via its ends closest to the annular bodies 48A, 57A.

The recess 50A of the third means 42A—which is configured as a plate in the present exemplary embodiment—is provided in such a way that the oscillating movement or swivelling movement of the plate 42A effects a rotational movement limited in terms of time of one of the annular bodies 48A or 57A around the output mechanism 46, and the rotational movement of one of the annular bodies 48A, 57A is transferred via the spring 52A to the output mechanism 46. To ensure an unimpeded, frictionless rotational movement of the annular bodies 48A, 57A, the two annular bodies 48A, 57A are situated with play on the output mechanism 46 configured as a shaft.

The recess 50A of the plate 42A extends in the axial direction of the output mechanism 46 and has a greater diameter in its center region than the two outer regions, each of which abuts the center region. If the plate 42A is located in the position shown in FIG. 6, the oscillating movement of the plate 42A is transferred to the annular body 57A and causes the annular body 57A to twist. As a result of the twisting, the spring 52A configured as a coil spring and interconnected with the annular body 57A in fixed fashion is also twisted and wound, which results in a reduction of the cross-section of the spring 52A and a temporary non-positive connection between the spring 52A and the output mechanism 46, and, finally, effects a rotational movement of the output mechanism 46.

The mode of action of the arrangement of the oscillating crank 16A described hereinabove applies similarly for the arrangement of the oscillating crank 16B having identically-structured elements. When the output mechanism 46 is driven via the oscillating crank 16B, this results in the oscillating crank 16A being driven each time the position of the input shaft 12 is displaced by 180°. The driving of the output mechanism 46 corresponds to a plurality of individual, closely successive rotational movements which, due to the two oscillating cranks 16A, 16B, effect a nearly continuous rotational driving of the output mechanism 46.

Figure 6:
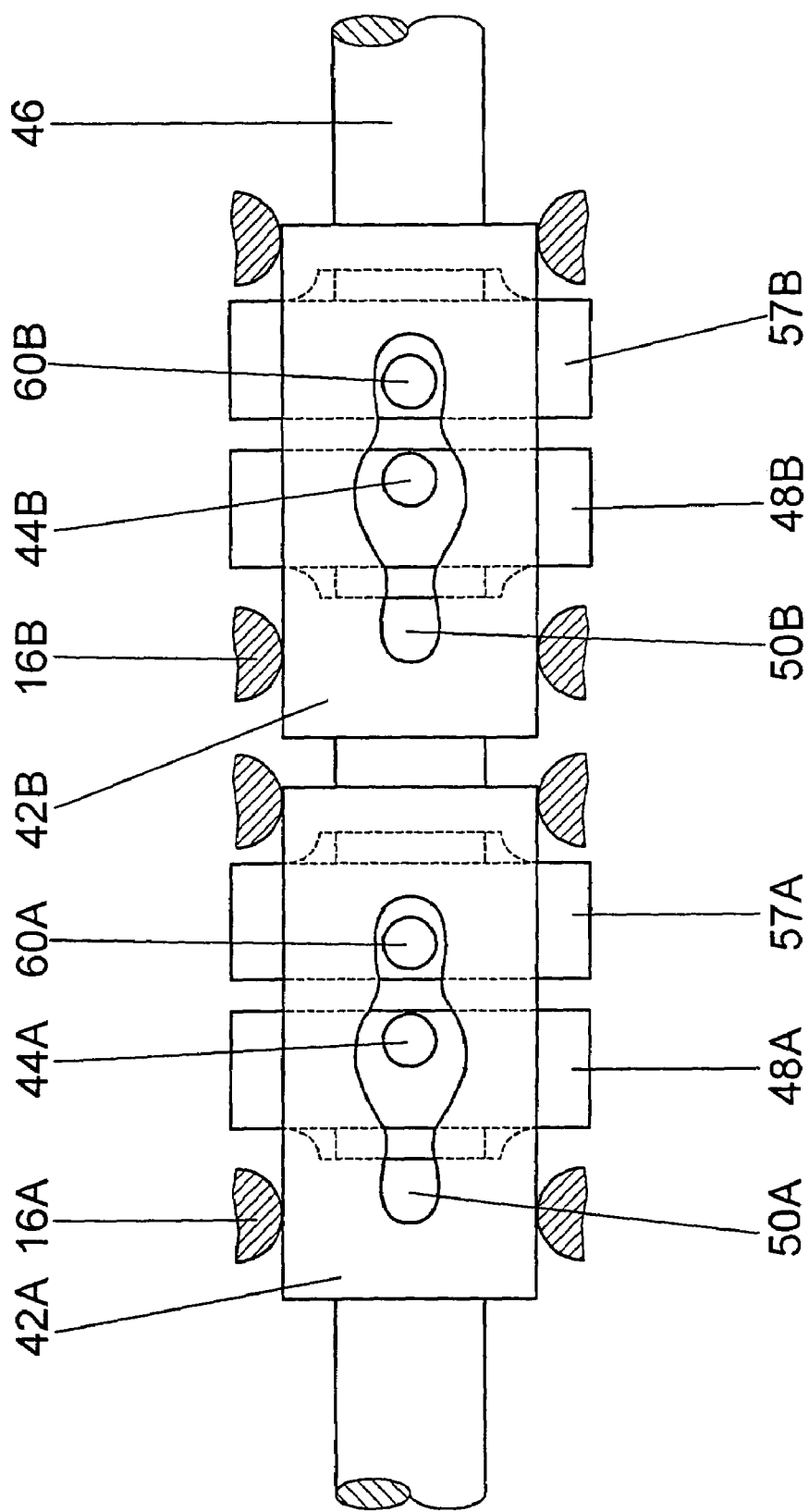
FIG. 6 is the partial view of the device according to FIG. 5 shown in a side view.

If the plate 42A is displaced from its position shown in FIG. 6 in the axial direction of the output mechanism 46 via a not-shown means in such a way that the guide element 44A is located in the outer region of the recess 50A—which is free in FIG. 6—and the guide element 60A is located in the center region of the recess 50A configured with the larger diameter, the annular body 48A of the oscillating crank 16A is set into rotation via the plate 42A. The output mechanism 46 is thereby driven in the opposite direction of the rotational movement effected by the annular body 57A. When a changeover takes place, the means and/or the plates 42A and 42B are displaced essentially simultaneously.

Figure 7:
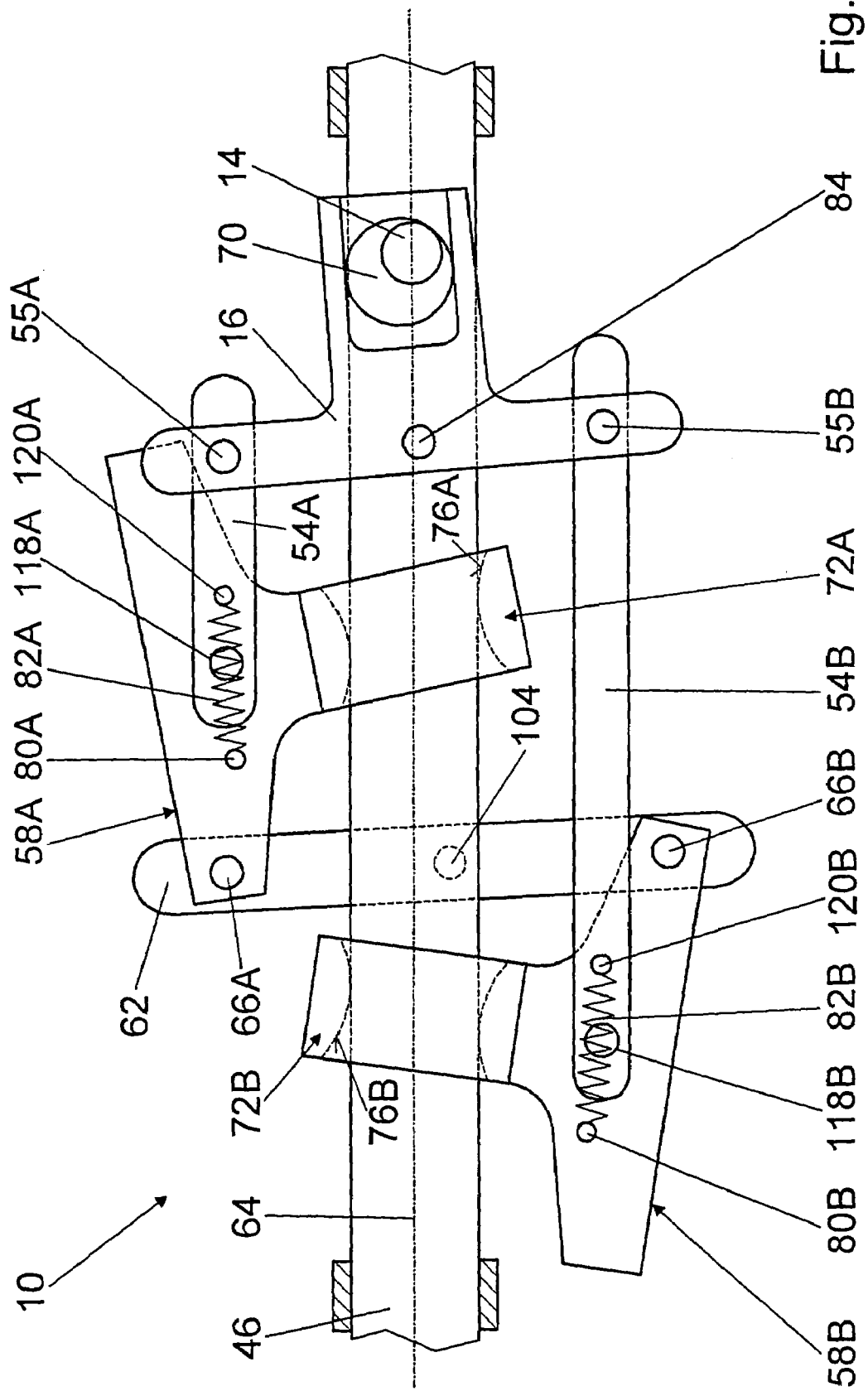
FIG. 7 is a further exemplary embodiment of the device according to the invention. A rotational movement of the input shaft is converted into a translational movement of the output mechanism.
Figure 8:
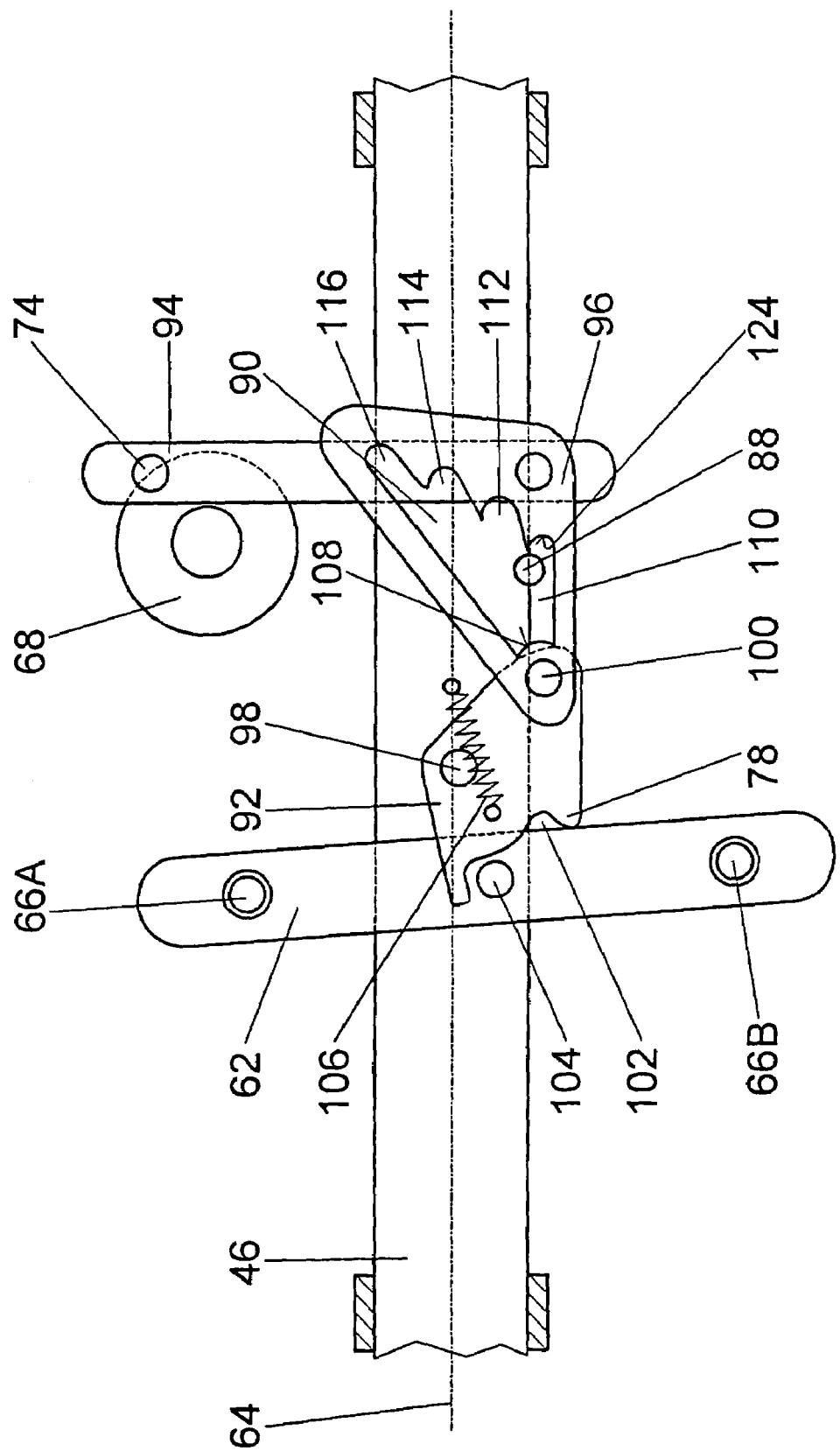
FIG. 8 shows a conversion mechanism of the device according to FIG. 7.

FIGS. 7 and 8 show a further exemplary embodiment of the device 10, in the case of which an alternating swivelling movement of a further structural embodiment of the first means 16 that is triggered by a rotation of the input shaft 14 is converted into a translational movement of the output mechanism 46 configured as tool holder of a power handsaw or the like. The first means 16 is configured in the shape of a "T", namely with a first crossbar extending substantially at a right angle to the output mechanism 46, and a leg extending substantially parallel with the output mechanism 46.

The first means 16 is supported in pivoting fashion at an attachment point 84 in the vertex of the crossbar and the leg. At its end, the leg is configured in the shape of a fork and grips around an eccentric element 70 driven by the input shaft 14. Two lever elements 54A, 54B are turnably mounted on the ends of the crossbar of the first means or the oscillating cranks 16 via the bolts 55A, 55B serving as pivots. The two lever elements 54A, 54B extend substantially parallel to the output mechanism 46 and create a functional connection between the oscillating crank 16 and two gripper elements 58A, 58B via two bearing bolts 118A, 118B.

The two gripper elements 58A, 58B are interconnected via a further lever element 62 extending transversely to the output mechanism 46. Said gripper elements are capable of being tilted relative to a centerline 64 of the output mechanism 46 depending on the alternating movement of the oscillating crank 16A.

The further lever element 62 is connected hingedly with the gripper elements 58A, 58B via two pins 66A, 66B. During operation, the two pins 66A, 66B are displaced in translational fashion nearly parallel to the centerline 64 of the output mechanism 46. In order to ensure that the pins 66A, 66B move in this fashion, bores for accommodating the pins 66A, 66B of the further lever element 62 are configured with a larger diameter than the diameter of the pins 66A, 66B.

The oscillating crank 16 is capable of being driven with an alternating movement by the input shaft 14 via the eccentric element 70, namely in a manner that allows it to pivot around its attachment point 84 in the clockwise direction and in the counter-clockwise direction. Each of the two gripper elements 58A, 58B extends across the output mechanism 46 with a hub-shaped gripper arm 72A, 72B, respectively, to transmit the alternating movement of the oscillating crank 16. On their inner sides 76A, 76B closest to the output mechanism 46, the gripper arms 72A, 72B comprise domes directed in the direction of the output mechanism 46, said domes being in contact with the output mechanism 46.

The gripper arms 72A, 72B and the output mechanism 46 are arranged relative to each other in such a way that, when the oscillating crank 16 makes a swivelling movement in the counter-clockwise direction, the gripper element 58A locks up with the output mechanism 46 and effects a stepwise translational movement of the output mechanism 46 in the direction away from the input shaft 14, whereby the second gripper element 58B simultaneously releases the output element 46.

When the oscillating crank 16 makes a swivelling movement in the clockwise direction, the gripper element 58B locks up with the output mechanism 46 and effects a stepwise translational movement of the output mechanism 46 in the direction away from the input shaft 14, whereby the first gripper element 58A simultaneously releases the output mechanism 46.

One spring element 82A, 82B, respectively, is located between a fastening 80A of the first gripper element 58A and a fastening 120A of the first lever element 54A, and between a fastening 80B of the second gripper element 58B and a fastening 120B of the second lever element 54B, which said spring elements ensure two stable end positions of the gripper elements 58A, 58B. One skilled in the art understands as a matter of course that, with consideration for a specific application, in deviation from the number of gripper elements 58A, 58B shown in FIG. 7, more or fewer gripper elements arranged in tandem on the output mechanism 46 can be provided to drive the output mechanism 46.

An automatically-operating changeover device for reversing the direction of movement of the output mechanism 46 is shown in FIG. 8. A bolt 88 is interconnected with the output mechanism 46, which said bolt engages in an opening 90 of a triangular plate element 96 tiltably situated between a snap-in element 92 and a third lever element 94 extending substantially transversely to the output mechanism 46. The snap-in element 92 is turnably supported via a further bolt 98 in a not-shown housing of the device 10, and it is turnably interconnected via a bolt 100 with the plate element 96. Furthermore, the snap-in element 92 comprises a wave-shaped recess 102 on its end furthest from the plate element 96, in which said recess a pin 104 interconnected in fixed fashion with the further lever element 62 is located.

A spring 106 that is interconnected in fixed fashion via its one end with the housing of the device 10 and, via its other end, with the snap-in element 92 enables the snap-in element 92 to always bear against the pin 104 with its recess 102.

When the plate element 96 is moved by the output mechanism 46 in the direction of the snap-in element 92—which is effected by the alternating movement of the gripper elements 58A, 58B—the bolt 88 rests on a surface 108 after a certain displacement travel of the output mechanism 46, whereby the surface 108 forms an end of a slot 110 of the opening 90.

If the bolt 88 is displaced further in the direction of the snap-in element 92 after it comes to rest on the surface 108, a rotational movement of the snap-in element 92 around the bolt 98 in the clockwise direction is triggered. The spring element 106 thereby causes two stable end positions to be reached.

From this, a displacement of the lever system according to FIG. 7 results such that the further lever element 62 displaces and/or drives the gripper elements 58A and 58B positioned by the spring elements 82A, 82B in terms of their associated lever arms 54A and 54B, respectively. Namely, the lever element 62 is displaced with its pin 104 transversely to the output mechanism 46 starting at pin 66B in the direction of pin 66A, which results in the gripper element 58A tilting in the clockwise direction and the gripper element 58B tilting in the counter-clockwise direction. The spring elements 82A, 82B now maintain the frictional connection for the opposed direction of movement of the output mechanism 46. As a result, the output mechanism 46 is subsequently driven in translational fashion from left to right as seen in FIG. 8. If the bolt 88 comes to rest in the slot 110 on a surface 124 of the plate element 96 opposite the surface 108, the changeover device is returned to its home position, and the output mechanism 46 is driven in translational fashion from right to left once more as seen in FIG. 8.

The opening 90 in the plate element 96 and/or its shape is provided such that it comprises a plurality of guide slots 112, 114 and 116 having different lengths. At its end furthest from the connection point with the plate element 96, the third lever element 94 is turnably interconnected via a bolt 74 with a rotary disk 68. If an operator rotates the rotary disk 68, the plate element 96 is tilted such that a guide slot 110, 112, 114 or 116 is set for the bolt 88 as a guide for the movement of the bolt 88 that is desired depending on the requirement. The rotary disk 68 is therefore a means for adjusting a total stroke of the output mechanism 68 resulting from the individual strokes and/or for limiting its travel.

What is claimed is:

1. A device for driving an output mechanism, comprising a rotationally drivable input shaft; means adapted to be located between said input shaft and the output mechanism for transmitting a drive torque of said input shaft to the output mechanism, said transmitting means including first means formed so as to provide a non-positive functional connection between said first means and the output mechanism and enabling an alternating movement of said first means to be converted into the movement of the output mechanism; a spring element applying a force for controlling the non-positive functional connection, said means also including further means situated such that they are displaceable relative to said first means and are functionally interconnected with said first means such that the alternating movement of said first means effects an oscillating movement of said further means, said further means being functionally interconnectable with one annular body respectively situatable on the output mechanism via one guide element respectively, each of said guide elements being connected with its end farthest from said annular bodies to said further means, and with its end closest to said angular bodies being interconnected in fixed fashion with one of said annular bodies respectively.

2. A device as defined in claim 1 wherein said input shaft includes an eccentric element which is functionally interconnected with said first means so that when said input shaft rotates, said first means are moved in alternating fashion depending on a movement of said eccentric element.

3. A device as defined in claim 1, wherein said first means are formed so that an alternating rotational movement of said first means is convertable into a rotational movement of the output mechanism.

4. A device as defined in claim 3 wherein said means are formed so that a conversion ratio between the alternating rotational movement of said first means and the rotational movement of the output mechanism is variable.

5. A device as defined in claim 1 wherein each of said guide elements is situated with its end farthest from said annular bodies respectively in a recess of said further means.

6. A device as defined in claim 5 wherein said spring element is formed so as to encircle the output mechanism and is situated between said annular bodies, said spring element being interconnected with said annular bodies in torsion-proof fashion via ends of said spring element closest to said annular bodies.

7. A device as defined in claim 5 wherein said recess of said further means is formed such that the oscillating movement of said further means effects a rotational movement of one of said annular bodies, and the rotational movement of one of said annular bodies is transferrable to the output mechanism via said spring element.

* * * * *